United States Patent [19]

Popp

[11] 4,039,920
[45] Aug. 2, 1977

[54] CYCLING TYPE OF ELECTRONIC BATTERY CHARGER

[75] Inventor: Ralph Popp, Pittsburgh, Pa.

[73] Assignee: Westinghouse Air Brake Company, Swissvale, Pa.

[21] Appl. No.: 548,422

[22] Filed: Feb. 10, 1975

Related U.S. Application Data

[63] Continuation of Ser. No. 411,371, Oct. 31, 1973, abandoned.

[51] Int. Cl.² .............................................. H02J 7/04
[52] U.S. Cl. ...................................... 320/22; 320/39
[58] Field of Search ................................. 320/22-25, 320/13, 14, 21, 19, 39, 40

[56] References Cited

U.S. PATENT DOCUMENTS

| 3,313,995 | 4/1967 | Bach et al. ............................. 320/25 |
| 3,531,706 | 9/1970 | Mullersman ........................ 320/39 X |
| 3,602,794 | 8/1971 | Westhaver .......................... 320/22 X |
| 3,659,181 | 4/1972 | Bembenek .......................... 320/39 X |

Primary Examiner—Robert J. Hickey
Attorney, Agent, or Firm—R. W. McIntire, Jr.; J. B. Sotak

[57] ABSTRACT

This disclosure relates to a cycling type of a constant current electronically controlled battery charger having a reactive transformer, a full-wave rectifier, a series regulator and a sensing and control circuit for alternately supplying a low and high charging rate to a rechargeable battery whereby the battery is constantly "worked" in order to prevent accelerated deterioration of the battery.

9 Claims, 1 Drawing Figure

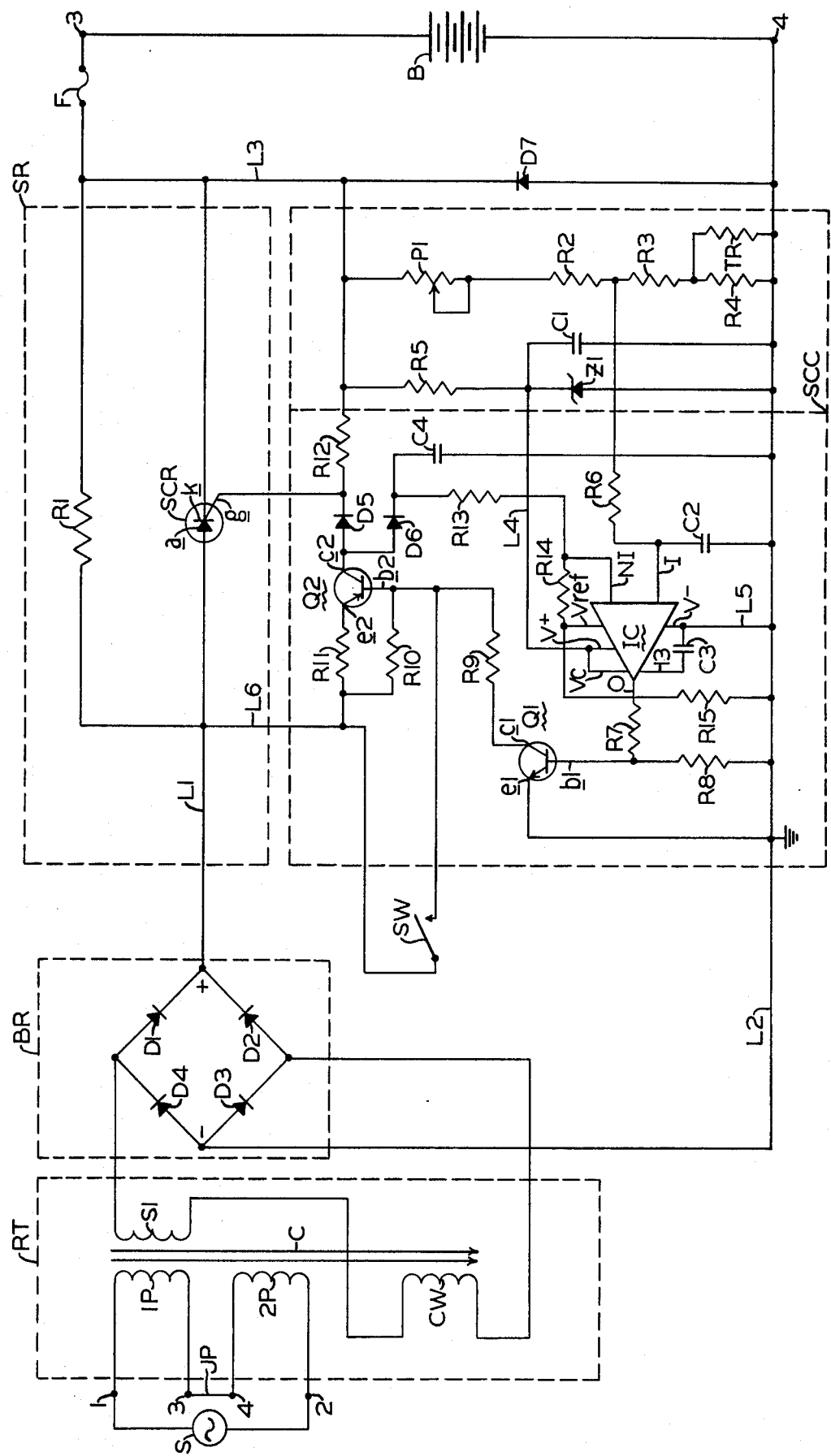

CYCLING TYPE OF ELECTRONIC BATTERY CHARGER

This is a continuation, of application Ser. No. 411,371, filed Oct. 31, 1973, now abandoned.

FIELD OF THE INVENTION

This invention relates to a cycling type of electronically controlled battery charger and more particularly to a constant current battery charging circuit for constantly working a battery by vacillating the voltage applied to the battery by repeatedly varying the charging rate between an upper voltage level and a lower voltage level.

BACKGROUND OF THE INVENTION

In certain conventional battery chargers it is common practice to normally supply power to an undercharged battery at an initially high rate and thereafter to subsequently reduce and taper the rate to near zero when the battery is fully charged. This type of charging is normally referred to as taper charging since the current value is continually being reduced towards zero. However, when using this type of battery charging technique, extreme care and certain precautionary measures should be taken in order to obtain maximum efficiency and long battery life. For example, when a fully charged battery has not been used for a period of time, it is necessary to provide an "overcharge" or "equalizing charge" in order to enable the battery to meet subsequent load demands. It is good preventative maintenance practice to overcharge a dormant or seldom used battery at least once a month. The overcharge is given to keep the battery in good condition, and to prevent the development of inequalities in good condition of the individual cells. Thus, the utilization of taper type of battery charging equipment entails additional cost and time in maintaining full capacity by requiring the battery to be periodically "overcharged" in order to meet full capacity demands. There have been various attempts to alleviate the shortcomings of previous types of battery charges; however, these former endeavors have fallen short of expectation. In order to provide a highly stable and efficient battery charger, it is necessary to eliminate excessive electrical power losses, to obviate undue and repeated adjustments and to avoid the need of periodic "equalizing" charging.

Accordingly, it is an object of my invention to provide a new and improved cycling type of an electronically controlled battery charger.

A further object of this invention is to provide a novel battery charging circuit for constantly "working" a rechargeable battery by vacillating the voltage applied to the battery.

Another object of my invention is to provide a unique electronically controlled two-rate battery charging circuit for cycle charging a battery.

Yet a further object of my invention is to provide an improved battery charger employing controllable series connected semiconductive device for alternately applying a high rate of charge and a low rate of charge on a rechargeable battery.

Still another object of my invention is to provide a new automatic battery charging circuit arrangement employing a series regulator for cycling the voltage applied to a battery.

Still a further object of my invention is to provide a novel automatic constant current electronic battery charger employing a reactive transformer, a bridge rectifier, a voltage regulator and a sensor and control circuit for varying the voltage level supplied to a rechargeable battery.

Yet another object of my invention is to provide a novel and unique battery charging circuit which causes a rechargeable battery to be continually "working" so that little, if any, sulphation occurs and periodic "equalizing" is unnecessary.

An additional object of my invention is to provide a novel and improved constant current two-rate electronic battery charger which is economical in cost, simple in design, reliable in operation, durable in use and efficient in service.

SUMMARY OF THE INVENTION

In accordance with the present invention, the electronic constant current two-rate charging cyclical battery charger circuit arrangement includes an adjustable core reactive transformer having its primary connected to an alternating current power supply. The secondary of the adjustable reactive transformer is connected to the a.c. terminals of a full-wave bridge rectifier network. The d.c. terminals of the full-wave bridge rectifier network is connected to a series regulator including a parallel-connected resistor and silicon-controlled rectifier. A sensor and control circuit includes a voltage differential network for sensing the amplitude of the voltage appearing across the respective output battery terminals. The output of the voltage differential network is connected to the inverting input of an integrated circuit operational amplifier. The output of the integrated circuit operational amplifier is connected to the input of a driving amplifying transistor stage. The output of the driving amplifying transistor stage is connected to the input of a driven switching transistor stage. The output of the driven switching transistor stage is connected to the gate electrode of the silicon-controlled rectifier. Thus, a high charging rate is supplied to the battery by the silicon-controlled rectifier when the battery voltage level is below a first predetermined value and a low charging rate is supplied to the battery by the resistor when the battery voltage level is above a second predetermined value. A hysteresis voltage is supplied to the integrated circuit operational amplifier during the conduction of the driven switching transistor stage in order to continually "work" the battery and prevent sulphation. A semiconductive diode is directly connected across the battery terminals to prevent damage from occurring to the various polarity sensitive components when the battery is reversely connected across the output terminals.

The foregoing objects and other additional features and advantages of my invention will become more fully evident from the foregoing detailed description when considered in conjunction with the accompanying drawings wherein:

DESCRIPTION OF THE DRAWINGS

The single FIGURE is a schematic circuit diagram illustrating a preferred embodiment of the cycling type of an electronic constant current two-rate charging battery charger circuit of the present invention.

DESCRIPTION OF THE PREFERRED EMBODIMENT

Referring now to the single FIGURE of the drawings, there is shown the semiconductive constant current two-rate battery charging circuit arrangement employing an adjustable reactive transformer RT, a full-wave bridge rectifier network BR, a series regulator SR and a sensor and control circuit SCC.

A suitable power supply, such as, a 240 volt alternating current source S, is connected to input terminals 1 and 2 of the battery charger. The a.c. input supply terminals are connected in series with the two coils 1P and 2P of the primary winding of the adjustable core reactive transformer RT. It will be seen that the primary windings 1P and 2P are connected in a series additive fashion by a jumper wire JP which extends from terminals 3 and 4 when the 240 volt a.c. power supply S is connected to terminals 1 and 2. In the case where a 120 volt alternate current voltage supply is utilized, it is understood that a first jumper wire is connected from terminal 1 to terminal 4 and that a second jumper wire is connected from terminal 2 to terminal 3. The reactive transformer RT includes an adjustable magnetic core C in the form of a movable block which can vary the flux linkage between the primary windings 1P and 2P and a secondary winding S1. A compensation winding CW is also wound on core member C and is electrically connected in series with the secondary winding S. The purpose of compensation winding CW is to offset the losses that occur in the series regulator SR as will be described in detail hereinafter.

The respective ends of the secondary winding S1 and the compensation winding CW are serially connected to the a.c. input terminals of the full-wave bridge rectifier BR. The bridge rectifier BR includes a plurality of diode rectifiers D1, D2, D3 and D4 which are suitably poled to supply constant direct current on the d.c. output voltage terminals. The positive d.c. voltage terminal of the bridge rectifier BR is connected to power lead L1 while the negative d.c. voltage terminal is connected to the common or ground lead L2.

The lead L1 is connected to the series regulator SR which includes a high rate charging path having a semiconductive element, such as, silicon-controlled rectifier SCR, and a low rate charging path having a fixed impedance element, such as, power resistor R1. The silicon-controlled rectifier SCR includes an anode electrode $a$, a cathode electrode $k$ and a gate electrode $g$. The anode electrode $a$ of silicon-controlled rectifier SCR and one end of resistor R1 are connected in common and in turn are connected to lead L1. The cathode electrode $k$ of silicon-controlled rectifier SCR and the other end of the resistor are connected in common and in turn are connected to fuse F, the purpose of which will be described in greater detail hereinafter. The gate electrode $g$ of silicon-controlled rectifier SCR is connected to the sensor and control circuit SCC which controls the conductive condition of the silicon-controlled rectifier in accordance with the voltage level of a rechargeable battery, as will be described presently.

The sensor and control circuit SCC includes a voltage sensing network which connected across the respective output battery terminals 3 and 4 via lead L3 and fuse element F and common lead L2, respectively. The voltage sensing network includes an adjustable resistance, such as, a potentiometer P1 and resistors R2, R3 and R4. A temperature sensitive resistor TR which provides compensation for variations in temperature is connected in parallel with resistor R4. In actual practice, the temperature compensation of the terminal voltage is at approximately one percent (1%) for each ten degrees (10°) Fahrenheit. A reference voltage divider network including resistor R5 and zener diode Z1 is also connected across the respective output terminals. The voltage appearing across the zener diode A1 remains substantially constant and any voltage variation of the battery will be reflected in the amount of voltage developed across resistor R5. A ripple filter capacitor C1 is connected in parallel with the zener diode Z1.

The control portion of the sensor and control circuit SCC includes a linear integrated circuit operational amplifier IC which is supplied with a constant supply voltage by being connected across the zener diode Z1 via conductors or leads L4 and L5. The operational amplifier IC has a pair of inputs I and NI and a single output O. The operational amplifier may be of the differential input signal type in that it functions by the difference in signals that are applied to the two inputs. The operational amplifier may be of the type manufactured and sold by the Fairchild Semiconductor Corporation of Mountainview, California and identified by model designation No. U6A7723393. The input I is termed the inverting input terminal and is connected via resistor R6 to the junction point between resistor R2 and resistor R3 of the voltage sensing network. A filter capacitor C2 is connected from terminal I to lead L2. The input NI is termed the noninverting input terminal and is connected to a voltage hysteresis network which will be described hereinafter. A negative supply terminal $V-$ is connected to common lead L2 by conductor L5. A frequency compensation terminal 13 is connected to lead L5 via capacitor C3. A voltage reference terminal $V_{ref}$ is also connected to the above-mentioned voltage hysteresis network. The positive supply terminal $V+$ and the collector voltage supply terminal $V_c$ are connected in common and in turn are connected to the junction point formed between resistor R5 and the cathode electrode of zener diode Z1. The output terminal 0 of the integrated circuit IC is connected to the input of a driver amplifier stage.

As shown, the driver stage includes an NPN transistor Q1 having an emitter electrode $e1$, a collector electrode $c1$ and a base electrode $b1$. The output terminal O of integrating circuit IC is connected to the base electrode $b1$ via a resistor R7. The base electrode $b1$ is also connected to the common lead L2 via a biasing resistor R8. The emitter electrode $e1$ of transistor Q1 is directly connectd to common or ground lead L2. The output of the driving amplifying transistor Q1 is connected to the input of a driven switching stage.

The driven stage includes a PNP transistor Q2 having an emitter electrode $e2$, a collector electrode $c2$ and a base electrode $b2$. As shown, the collector electrode $c1$ of transistor Q1 is connected by resistor R9 to the base electrode $b2$ of the switching transistor Q2. The base electrode $b2$ of transistor Q2 is also connected to the positive power lead L1 via biasing resistor R10 and lead L6. The emitter electrode $e2$ of transistor Q2 is connected to positive conductor L2 via a current limiting resistor R11 and lead L6. The collector electrode $c2$ of switching transistor Q2 is connected to the gate electrode $g$ of the silicon-controlled rectifier SCR via a diode D5. The cathode of the diode 5 is connected by resistor R12 to lead L3. The collector electrode $c2$ of transistor Q2 is also connected to the previously mentioned voltage hysteresis network.

It will be noted that the hysteresis network includes a diode D6, a resistor R13, a resistor R14 and a resistor R15. A filter capacitor C4 is connected across the resistive divider network formed by resistors R13, R14 and R15 to reduce the effects of a.c. ripple. As shown, the noninverting terminal Ni and the voltage reference terminal $V_{ref}$ of the integrated circuit IC are connected to the respective ends of the hysteresis resistor R14, the purpose of which will be described hereinafter.

Further, it will be noted that a reversely poled diode D7 is connected across the terminals 3 and 4 via lead L3 and fuse element F. As shown, a suitable rechargeable battery B, such as, a lead-acid storage battery, has its positive terminal connected to output terminal 3 and has its negative terminal connected to the output terminal 4.

It will be noted that a manually operable voltage monitoring switch SW is connected between the base electrode $b2$ of the switching transistor Q2 and lead 6. The switch SW permits a maintainer to monitor the low charging rate at any time and allows accurate adjustment of the charging voltage levels when the load varies due to changes in the temperature and the like.

In describing the operation, it will be assumed that the charger circuit is intact and functioning properly, that the a.c. power supply S is connected to input terminals 1 and 2 so that constant current is available at the d.c. output terminals of the bridge rectifier BR, and that the rechargeable storage battery B is properly connected across output terminals 3 and 4, as shown. Let us further assume that the condition of the battery is such that a low charging rate is being supplied by the battery charger. The low charging rate which is set to be slightly less than the sum of the average load plus circuit losses is supplied to the battery via the resistor R1 since the silicon-controlled rectifier is in a nonconductive condition. The low charging rate will continue to be applied to the battery B so long as the voltage appearing across the battery is above a first predetermined level, namely, above the average load plus losses. When the voltage of the battery reaches or falls below the first predetermined value, the charging rate will automatically be shifted to the high charging rate. That is, the reduction in battery voltage is constantly sensed by the voltage sensing network, and when the junction between resistors R2 and R3 supplies a voltage which is equal to the voltage on reference terminal $V_{ref}$, the integrated circuit IC produces a positive output voltage on terminal O. The positive voltage on terminal O is supplied to the base electrode $b1$ and causes the amplifying transistor Q1 to become conductive. The conduction of transistor Q1 causes base current to flow into transistor Q2 so that is is switched ON. The turning on of switching transistor Q2 causes a gate signal to be applied to the gate electrode $g$ so that the silicon-controlled rectifier SCR is rendered conductive. The conduction of silicon-controlled rectifier SCR furnishes a high charging rate to the battery B so that its voltage begins to increase slowly. The conduction of transistor Q2 causes current to flow through diode D6 and resistors R13, R14 and R15 of the hysteresis network. Thus, the current flowing, the network produces a voltage drop across the hysteresis resistor R14 which causes a slight increase in the reference voltage which appears on noninverting terminal NI. This slight increase in voltage results in hysteresis effect which requires that the battery voltage must rise to a second predetermined value before the silicon-controlled rectifier SCR is rendered nonconductive. In practice, the hysteresis action compels the battery terminal voltage to be increased approximately 0.5 volts above the first predetermined value. This hysteresis action results in the continual "working" of the battery so that sulphation of the battery will not occur due to the battery "resting" at a given voltage level. The built-in hysteresis also prevents ephemeral switching of the silicon-controlled rectifier since a finite amount of time is required to raise the battery terminal voltage 0.5 volts. During light load demand periods, the time between the low rate and the initiation of the high rate, and vice versa, may be in terms of hours, and conversely, during heavy load demand periods the time span may be measured in minutes. When the battery terminal voltage reaches the second predetermined value, the sensing network and the integrated circuit IC cause the amplifying transistor Q1 to turn off. The turning off of transistor Q1 renders the switching transistor Q2 nonconductive which, in turn, causes the silicon-controlled rectifier SCR to become nonconductive since the rectified voltage passes through zero so that no holding current is available. When the silicon-controlled rectifier SCR is turned off, the charger reverts to its low charging rate since the resistor R1 again supplies power to the battery B. Depending upon the load demands on the battery B, the battery terminal voltage will normally gradually decrease until it again reaches the first predetermined value at which time the sensing and control circuit SCC will again render the silicon-controlled rectifer SCR conductive. The conduction of the silicon-controlled rectifier SCR will again result in the application of the high charging rate to the battery B. The cycle will continue to be repeated, and the voltage will vacillate between the first and the second predetermined voltage values. Thus, the charging rate is cycled between the high and low rates and the battery will be continually "worked" so that little, if any, sulphation will occur on the plates of battery B. Further, the cycling action enables "working" the battery constantly and thereby obviates the need of periodically providing an "equalizing charge" as was required in the past. It will be appreciated that the high rate voltage level should be set at a value which will not result in violent gassing of the battery so that excessive loss of the electrolyte is prevented.

If a maintainer desires to check the operation of the charger, he may do so by simply closing the monitoring switch SW. The closure of switch SW prevents the charger from cycling by disabling the high charging rate path provided by silicon-controlled rectifer SCR. That is, the switching transistor Q2 is permanently disabled by the closing of switch SW so that no gate signal is available for turning on the silicon-controlled rectifier SCR. Thus, a maintainer may readily measure and, if necessary, adjust the low charging rate with a resultant charge in the high charging rate of the battery charger.

As mentioned above, the charger is positively protected against damage of burn out or the like by an improperly connected battery by diode D7 and fuse F. If the battery B is connected in the reverse manner from that shown in the drawings, the diode D7 immediately conducts and short circuits the battery through fuse F. The short circuiting causes the fuse F to blow thereby immediately breaking the circuits so no resulting impairment will occur to the various current sensitive elements of the charger.

It will be appreciated that while the present charger has been described in regard to charging a lead-acid storage battery B, other types of rechargeable battery, such as nickel-cadium and the like, may also be connected across terminals 3 and 4. Further, it is understood that a power transistor, a silicon-controlled switch, etc., may be used in place of the silicon-controlled rectifier SCR. In addition, it is understood that other changes, modifications and alterations may be employed without departing from the spirit and scope of this invention. Thus, it will be appreciated that the showing and description of the present invention should be taken in an illustrative and diagrammatic sense only.

Having now described the invention what I claim as new and desire to secure by Letters Patent is:

1. A cycling type of electronically controlled battery charger comprising, reactive transformer means connected to a source of alternating current, said reactive transformer including an adjustable core block member for varying the magnetic coupling between the windings, rectifier means connected to said reactive transformer means, regulator means connected to said rectifier means, sensor and control means connected to said regulator means for sensing the value of the battery voltage and for causing said regulator means to assume a high charging rate when the battery voltage falls below a first predetermined value which is slightly less than the average load plus the circuit losses and for causing said regulator means to assume a low charging rate when the battery voltage rises above a second predetermined value which is greater than the average load plus the circuit losses, and said sensor and control means including hysteresis means for requiring the battery voltage to be raised to said second predetermined value before said regulator means assumes said low charging rate thereby causing a battery to be worked to prevent sulphation and to avoid the need of providing a periodic equalizing charge.

2. A cycling type of electronically controlled battery charger as defined in claim 1, wherein said regulator means includes a variable impedance device and a fixed impedance device.

3. A cycling type of electronically controlled battery charger as defined in claim 2, wherein said variable impedance device is a semiconductive element which furnishes the high charging rate to the battery.

4. A cycling type of electronically controlled battery charger as defined in claim 2, wherein the fixed impedance device is an electrical resistor which furnishes the low charging rate to the battery.

5. A cycling type of electronically controlled battery charger as defined in claim 1, further including a low charging rate monitoring circuit which is connected to said control means for rendering said high charging rate of said regulator means ineffective during periods of monitoring.

6. A cycling type of electronically controlled battery charger as defined in claim 12, wherein said sensor and control means includes a voltage divider circuit and a reference potential circuit as well as an integrated circuit amplifier, a driver and a switching semiconductive device.

7. A cycling type of electronically controlled battery charger as defined in claim 1, further including a diode which is connected across said sensor means to provide protection against reverse polarity battery connection.

8. A cycling type of electronically controlled battery charger as defined in claim 1, wherein said rectifier means is a full-wave bridge rectifier.

9. A cycling type of electronically controlled battery charger as defined in claim 6, further including a hysteresis circuit which provides a delaying action on said integrated circuit amplifier.

* * * * *

UNITED STATES PATENT AND TRADEMARK OFFICE
CERTIFICATE OF CORRECTION

PATENT NO. : 4,039,920
DATED : August 2, 1977
INVENTOR(S) : Ralph Popp

It is certified that error appears in the above–identified patent and that said Letters Patent are hereby corrected as shown below:

Column 8, line 22, change "12" to --1--

Signed and Sealed this

Twenty-fifth Day of April 1978

[SEAL]

Attest:

RUTH C. MASON
Attesting Officer

LUTRELLE F. PARKER
Acting Commissioner of Patents and Trademarks